July 6, 1965    P. E. BROWN    3,192,646
APPARATUS FOR CURING PLASTIC TUBULAR MEMBERS
Filed April 3, 1961    3 Sheets-Sheet 3

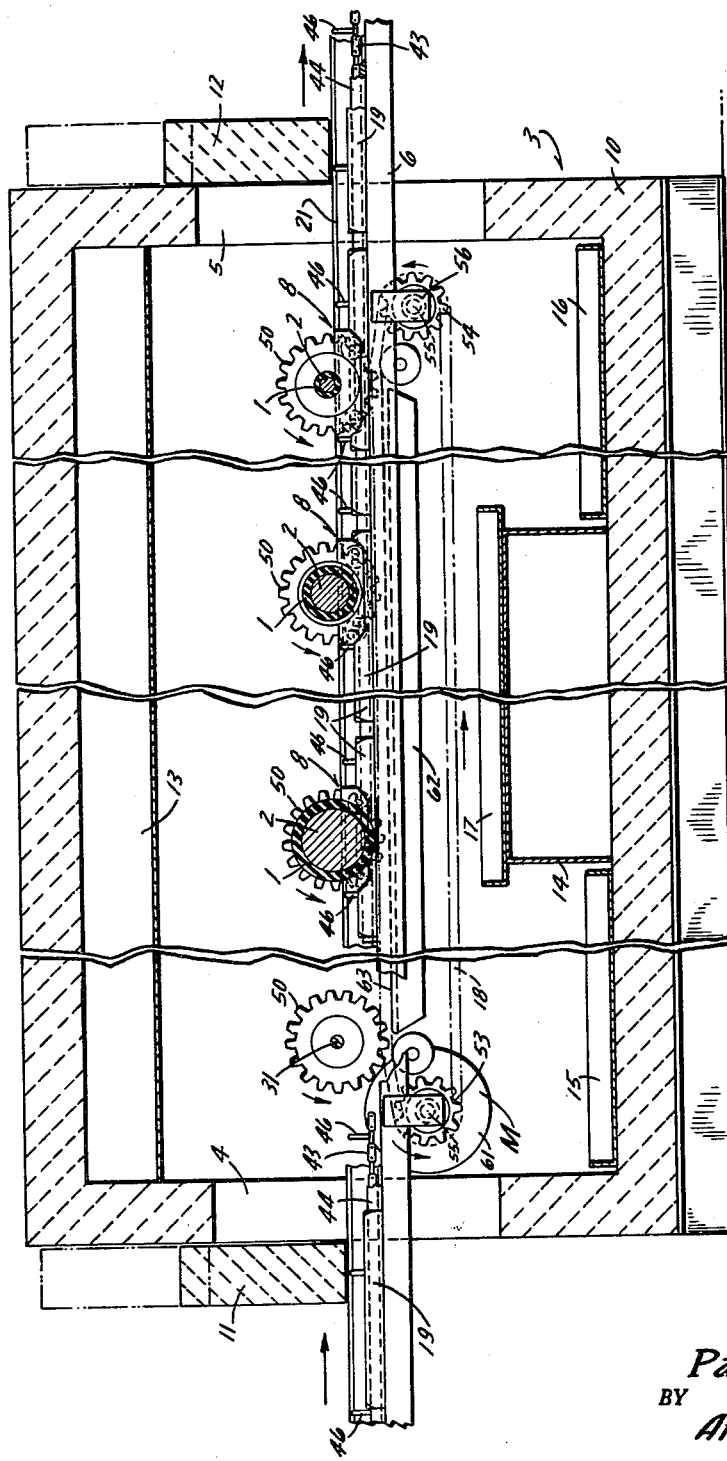

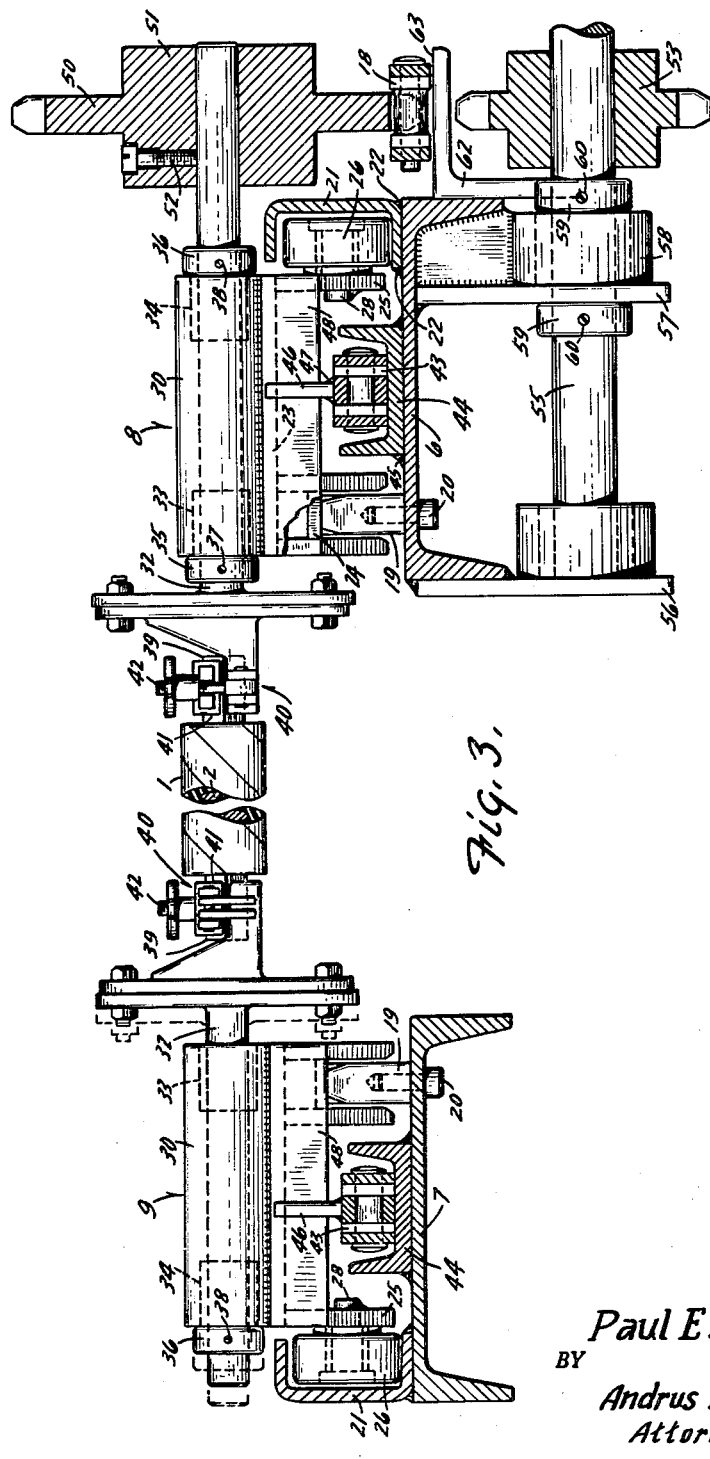

INVENTOR.
Paul E. Brown
BY
Andrus & Starke
Attorneys.

United States Patent Office 3,192,646
Patented July 6, 1965

3,192,646
APPARATUS FOR CURING PLASTIC TUBULAR
MEMBERS
Paul E. Brown, Butler, Wis., assignor to A. O. Smith
Corporation, Milwaukee, Wis., a corporation of New
York
Filed Apr. 3, 1961, Ser. No. 100,348
5 Claims. (Cl. 34—105)

This invention relates to a method and apparatus for curing plastic tubular members and particularly to the curing of fiber reinforced plastic pipe wound on a mandrel by passing the mandrel and the wound pipe through a curing furnace.

Glass fiber reinforced plastic pipe can be advantageously made by wrapping a strip of glass fiber reinforced thermosetting plastic on a mandrel with the plastic wholly or partially uncured. The mandrel with the plastic pipe wound thereon is passed through a suitable curing furnace to produce a rigid self-supporting glass fiber reinforced plastic pipe. Normally, the mandrel is supported on one end and projected into the furnace. A mandrel and wound pipe of any substantial length may sag while in the furnace and the cured pipe adversely deformed.

The present invention is directed to a method and apparatus for supporting the mandrel while in the furnace in a manner essentially eliminating sag and compensating for any slight sag which would tend to deform the mandrel and pipe.

In accordance with the present invention, the mandrel is firmly and fixedly supported at both ends against radial movement to form a fixed end beam support member as it is passed through the furnace. As a result, very minimal sag is encountered in the mandrel.

Normally, thermal expansion of the mandrel results from the mandrel heating in the furnace. In order to accommodate the axial expansion of the mandrel, at least one end support for the mandrel includes means to allow axial movement thereof.

The mandrel is also independently rotated about its own axis while in the furnace. The rotation of the mandrel promotes even heating of the pipe even though the movement through the furnace is momentarily stopped to provide complete curing of the plastic. The rotation also compensates for any sag which tends to form in the mandrel.

The drawings furnished herewith illustrates the best mode presently contemplated for carrying out the invention.

In the drawings:

FIG. 1 is a perspective view of a mandrel with a fiber reinforced pipe wound thereon;

FIG. 2 is a vertical section through curing apparatus constructed in accordance with the present invention with a series of wound pipes and mandrels positioned therein;

FIG. 3 is an end elevational view of FIG. 2 with parts broken away and sectioned;

Figure 4:
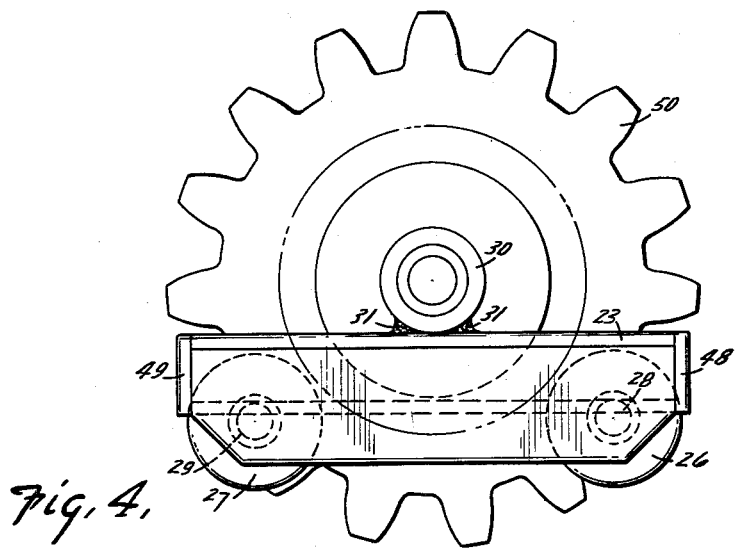
FIG. 4 is an enlarged side view of one mandrel support.

Referring to the drawing and particularly to FIG. 1, a plastic pipe 1 is shown wound upon a cylindrical mandrel 2. The pipe 1 is formed of a thermosetting resin having reinforcing glass fibers or the like, not separately shown therein. The pipe 1 is formed by winding a strip of reinforced plastic upon the mandrel 2 with the plastic in an uncured state. The mandrel 2 with the plastic pipe 1 wound thereon is passed through a curing oven 3 as shown in FIGS. 2 and 3. The temperature of the atmosphere in the curing oven 3 is sufficient to cure the plastic of the pipe 1 and to thereby provide a rigid self-supporting plastic pipe.

Generally, the curing oven 3 is a rectangular shaped unit somewhat wider than the length of the mandrel 2 to allow lateral movement of mandrels through the oven. An entrance opening 4 and a discharge opening 5 are provided in the opposite ends of the oven 3. As shown in FIGS. 2 and 3, carriage beds 6 and 7 are laterally spaced and pass through the oven 3 including the openings 4 and 5, providing a loading station adjacent the entrance opening 4 and an unloading station shown adjacent the discharge opening 5. The beds 6 and 7 are disposed on opposite sides of a mandrel 2 passing through the oven 3 and support mandrel carriages 8 and 9.

Mandrel carriage 8 is movably mounted on the carriage bed 6 and coupled to one end of the mandrel 2.

Carriage 8 supports the adjacent end of mandrel 2 and includes means causing mandrel 2 to rotate about the mandrel axis while in the oven 3, as more fully described hereinafter. Mandrel carriage 9 is movably mounted on the carriage bed 7 and coupled to the adjacent end of the mandrel 2. Carriage 9 rotatably and fixedly supports the opposite end of mandrel 2.

The illustrated oven 3 may be used for continuous flow processes wherein carriages and mandrels are at the unloading station or a batch process wherein a series of mandrels 2 are passed through the oven after which the carriages 8 and 9 are retracted to the loading station to receive a new series of mandrels. The carriages 8 and 9 are spaced for direction of travel such that there is no interference between adjacent mandrels 2 and the supported pipe 1. As mandrels 2 move through the oven 3, the heat cures the plastic of pipe 1 to form rigid self-supporting pipes.

Generally, the illustrated oven 3 includes a rectangular housing 10 of suitable heat insulating construction having the openings 4 and 5 in the opposite end walls thereof. End doors 11 and 12 are secured at the respective opposite ends and similarly mounted for vertical movement in any suitable manner, not shown. The doors 11 and 12 in the closed position rest on beds 6 and 7, as shown, and are raised upwardly to open the upper end of the openings 4 and 5, as shown in phantom. Suitable heating ducts 13 are secured in in the upper portion of the housing 10 immediately above the openings 4 and 5. High temperature air is introduced through the heating ducts 13 to increase the atmospheric temperature to the curing temperature of the plastic in pipe 1.

A recirculating duct 14 is secured to the floor of the housing 10 centrally of the ends of the rectangular oven housing 10. A pair of drip pans 15 and 16 are mounted on the floor of the housing 10 on opposite ends of the duct 14. A drip pan 17 is secured to the top of the duct 14 and extends laterally to overlap with the drip pans 15 and 16 and provide a continuous drip area in which any plastic falling from the pipe 1 will accumulate for subsequent reprocessing.

Referring particularly to FIG. 2, a drive chain 18 of the conventional track or caterpillar type is supported extending longitudinally of the housing 10 adjacent the side of the right-hand carriage bed 6 shown in FIG. 3. The drive chain 18, as subsequently described, is operable to rotate each of the mandrels 2 about its own axis while in the oven housing 10 independently of the movement through the housing. This insures continuous rotation of the mandrel 2 and the pipe 1 during the period the mandrel 2 is in oven 3 including periods when the lateral movement through the oven 3 is stopped to insure complete curing of the plastic.

Figure 5:
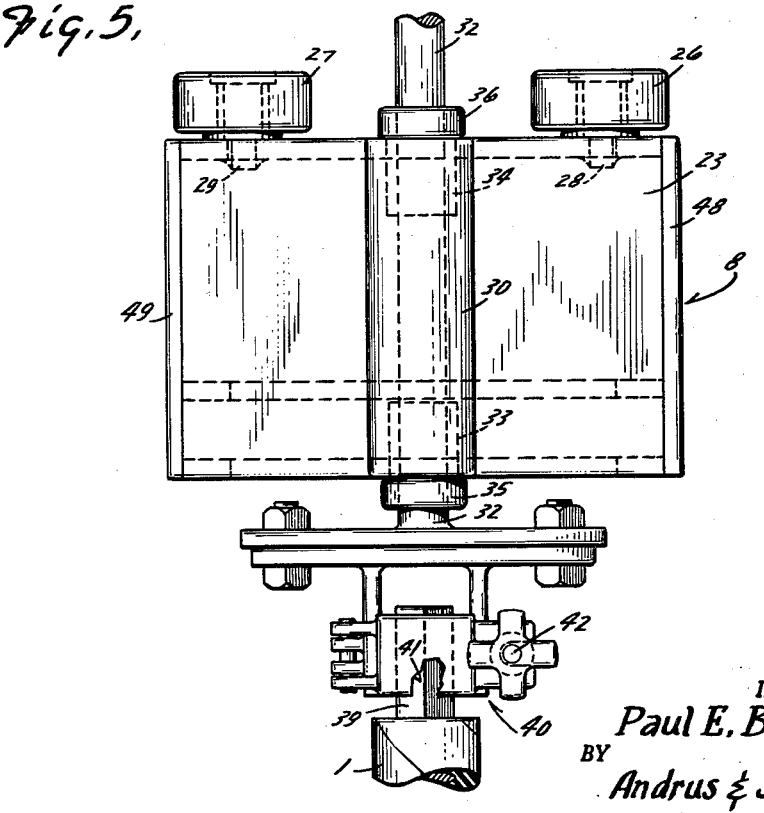
FIG. 5 is a top view of FIG. 4.

Referring particularly to FIGS. 3–5 in the drawings, the mandrel drive and support carriage 8 is more clearly shown as supported on the bed 6. The illustrated bed 6 is an inverted U-shaped channel extending through the oven 3 between the loading station and the unloading station on the opposite ends of the housing 10. A series of support rails 19 for a side of the carriage 8 are secured to the top surface of the bed 6 and extends longitudinally of the bed 6 immediately adjacent the innermost portion thereof and adjacent the one end of the mandrel 2. Rails 19 are secured in place by a tie-down bolt 20 which projects upwardly through suitable openings in the bed 6 and thread into correspondingly tapped openings in the support rails 19.

On the opposite side of the channel bed 6, a U-shaped track 21 is secured opening toward the support rails 19. The track 21 extends coextensive with the bed 6 and is secured in position as by welds 22.

The illustrated drive and support carriage 8 includes a base plate 23. An inverted channel-shaped guide 24 is secured to one edge of the base plate 23 and rides upon the support rails 19 to slidably support the base plate 23 of the carriage 8. The guide 24 extends generally coextensive with the edge of the plate 23 to provide a suitable high strength support of the carriage 8.

A bearing plate 25 is welded or otherwise secured to the opposite side undersurface of the base plate 23 and depends downwardly therefrom. Fore and aft support rollers 26 and 27 are secured to the lower end of the bearing plate 25 by suitable shafts 28 and 29. The shafts 28 and 29 are welded or otherwise secured within suitable openings in the plate 25 and located to dispose the rollers 26 and 27 within the U-shaped track 21 for low frictional support of the carriage 8.

An elongated journal 30 is secured by welds 31 extending laterally across the top of the base plate 23. A connecting shaft 32 is journaled in the journal 30 and extends outwardly from the opposite ends thereon. Suitable radial bearings 33 and 34 are provided within the opposite ends of the journal 30 to rotatably support the connecting shaft 32. Thrust and lock collars 35 and 36 encircle the shaft immediately adjacent the opposite ends of the journal 30. Set screws 37 and 38 thread through openings in collars 35 and 36 and bear on the adjacent connecting shaft 32 to lock the shaft 32 against axial movement while permitting free rotation about its own axis.

A mounting shaft 39 extends axially from the one end of the mandrel 2 for mounting of the adjacent end thereof to the connecting shaft 32. In the illustrated embodiment of the invention, a mandrel clamp 40 is secured to the adjacent end of shaft 32 and is of a two piece construction defining a shaft receiving recess or opening 41 aligned with shaft 39. The shaft 39 and the opening 41 have similar square cross sections to interlock the mandrel 2 to shaft 32. The two piece clamp 40 is pivotally connected at one side and releasably latched at the opposite side by pivoted latch bolt 42 for rapid and convenient mounting and demounting of a mandrel. The one end of the mandrel 2 is therefore rigidly fixed to the connecting shaft 32 to provide a fixed end support for the mandrel during the movement through the oven 3.

The carriage 9 generally corresponds to the above construction of the carriage 8 except that the innermost collar 35 is removed. Consequently, corresponding elements in the two carriages 8 and 9 are correspondingly numbered for clarity and simplicity of explanation.

The clamp 40 of carriage 9 connects the left connecting shaft 32 to the adjacent end of the mandrel 2. The connecting shaft 32 of the carriage 9 however may move laterally outwardly because of the removal of the collar 35. Consequently, as the mandrel 2 is moved through the oven 3, any axial expansion of the mandrel is accommodated by lateral movement of the connecting shaft 32 of the carriage 9, such as shown in the phantom line positioning of the clamp 40 of carriage 9.

Referring particularly to FIGS. 2 and 3, a drive chain 43 extends beneath the base plate 23 of carriage 8 between the guide 24 and the bearing plate 25. The drive chain 43 is mounted for reciprocating movement between the loading and unloading station in any suitable manner, not shown. A U-shaped support channel 44 is secured to the bed 6 as by welds 45 and opens upwardly to accommodate and guide the drive chain 43.

A series of drive blocks 46 are secured in spaced relation to the chain 43 by suitable welds 47. Each of the drive blocks 46 projects upwardly to the upper level of the base plate 23 of carriage 8. As chain 43 moves in one direction or the other, the blocks 46 engage the adjacent carriage 8 and carry the carriage 8 therewith to move the carriage 8 and the attached mandrel through the oven 3.

Plate-like braces 48 and 49 are secured to the front and back of the base plate 23 and extend downwardly of the base plate 23 to provide increased bearing engagement with the blocks 46 and to maintain rigidity in the carriage 8.

If the chain 43 is pulled from the loading station to the unloading station, the carriage 8 moves through the oven carrying the mandrel 2 therethrough. At the unloading station, the mandrels 2 are removed with the cured plastic pipe 1. The chain 43 may be reversely driven toward the loading station to return carriages 8 to the initial position to receive another mandrel 2 and an uncured plastic pipe 1. However, where a continuous flow is desired, the carriages 8 and 9 are removed from the beds 6 and 7 and returned to the loading station by a suitable truck or the like.

The mandrels 2 are continuously rotated as they move through the oven 3 in the illustrated embodiment of the invention as follows.

A sprocket 50 is fixedly secured to the outer end of the connecting shaft 32 of carriage 8. The sprocket 50 includes a hub 51 on the shaft 32 and a set screw 52 which projects therethrough and bears on the shaft 32 to lock the sprocket to the shaft. The sprocket 50 is aligned with the drive chain 18 which is mounted within the oven 3.

The illustrated drive chain 18 is rotatably supported on the front support sprocket 53 mounted adjacent the front of the oven and a rear support sprocket 54 mounted adjacent the rear of the oven housing 10. Sprockets 53 and 54 are similarly supported as most clearly shown in FIG. 3 upon the end of a sprocket shaft 55. A pair of spaced bearing plates 56 and 57 are secured to the depending flange portion of the inverted channel shaped bed 6 and carry bearings 58 within which shaft 55 is journaled to rotatably support the sprocket 53. A pair of lock collars 59 and set screws 60 are secured on opposite sides of the one bearing plate 57 and the adjacent bearing 58 to fix the shaft 55 against axial movement while permitting free rotation of the shaft 55 and the attached sprocket 53. Sprocket 54 is similarly supported.

A motor 61 is coupled to shaft 55 and when energized, rotates sprocket 53 and chain 18 in the direction opposite to the movement of the mandrels 2 through the oven 3. Consequently, the speed of chain 18 need not overcome the speed of the mandrels 2 through the oven 3. Further, if the mandrel 2 is held stationary within the oven 3 the speed of the chain 18 does not cause excessive spinning of the plastic pipe 1.

An L-shaped angle iron 62 is welded to the side of bed 6 adjacent the chain 18 with one flange projecting horizontally outwardly to provide a support surface 63 for the chain 18. The surface 63 holds chain 18 in operative engagement with the sprocket 50 which is secured to the connecting shaft 32 of the carriage 8.

The operation of the illustrated embodiment of the invention is summarized as follows.

The pipe 1 is wound upon the mandrel 2 with plastic in an uncured state. The mandrel 2 with pipe 1 is loaded or secured at its opposite ends to the carriages 8 and 9 at the loading station of the oven 3. After a series of mandrels 2 have been properly secured to the series of carriages 8 and 9, the chain drive, not shown, for the chain 43 is actuated to pull the drive chain 43 through the oven 3 and to thereby sequentially move the mandrels 2 into the oven housing 10. Spacing of the drive blocks 46 insures that the mandrels 2 will be held in proper spaced relation to prevent overlapping and interference between adjacent mandrels 2 and pipes 1.

Simultaneously, the drive motor 61 is energized to cause continuous rotation of the endless chain 18. As a mandrel 2 moves into the oven housing 10, the endless chain 18 engages the sprocket 50 which is secured to the mandrel connecting shaft 32 of carriage 8 and causes rotation of the sprocket 50 and the attached mandrel 2. The rotation of the mandrel 2 is maintained continuous during the complete period of time that the mandrel 2 is within the oven 3.

The fixed end support of the mandrel 2 by carriages 8 and 9 substantially reduces any sag of the mandrel therebetween and consequently prevents any noticeable deformation of the pipe 1. The rotation of the mandrel 2 promotes even heating of pipe 1 and compensates for slight sag which might occur in the mandrel 2 thereby producing a uniform high strength pipe 1 having minimal distortion.

As shown in FIG. 3, the connecting shaft 32 of the carriage 9 is free to move axially outwardly and takes up axial expansion of the mandrel 2 due to the heating thereof.

After the mandrels 2 have been moved in the oven 3, the drive for the chain 43 may be stopped and the pipe 1 held within oven 3 for a sufficient period to insure complete curing of the plastic. Thereafter, the chain drive is again actuated to pull the cured plastic pipe from the oven 3 and to the unloading station. At the unloading station, the mandrel 2 is removed and the rigid self-supporting plastic pipes 1 are removed after which the mandrels are returned to a suitable winding unit for receiving and forming subsequent pipe members. The drive for the chain 43 is reversed and the drive blocks 46 move in the reverse direction and pick up the respective carriages 8 and 9 to return the carriages to the loading station or the carriages 8 and 9 are removed and returned to the loading station to allow a continuous flow process. At the loading station, a new series of mandrels 2 will be mounted between the carriages 8 and 9.

Optimum formation of the pipe 1 results from the combined fixed end supports for both ends of the mandrel 2 in combination with the continuous rotation of the mandrel 2 generally independently of the movement of the mandrel 2 through the oven 3.

The present invention thus provides an improved and novel means for curing of a long plastic pipe and the like while preventing undue distortion of the pipe which might otherwise arise as a result of the oven temperatures. The structure is readily adapted to various sized diameter tubular members and to mass production processes for forming of plastic pipe.

Various modes of carrying out the invention are contemplated as being within the scope of the following claims particularly pointing out and distinctly claiming the subject matter which is regarded as the invention.

I claim:

1. A conveyor for moving a mandrel through an oven including a heated fluid means for heating the oven, said mandrel having a tubular heat treatable member encircling the mandrel, comprising releasable end connectors for connecting the opposite ends of the mandrel to the conveyor, longitudinal movable end support means releasably secured to the end connectors of the mandrel for fixedly and rotatably supporting the mandrel at the opposite ends to form a fixed beam support while in the oven, said support means including means permitting rotation of the mandrel about its own axis, means connected to move the mandrel through the oven, drive means operatively coupled to one end of the mandrel to establish and maintain rotation of the mandrel while in the oven without engagement with said covering.

2. The construction of claim 1, wherein said drive means comprises an endless drive member rotatably mounted and extending longitudinally within the oven, and a driven member secured to the support means for engaging the endless drive member when the mandrel is within the oven and connected to drive an end of the mandrel for rotating thereof about its own axis.

3. The construction of claim 2, having means to drive the endless drive member in the direction opposed to the movement of the mandrels through the oven.

4. A conveyor constructed in accordance with claim 1 and having supporting bed means extending through the oven and beyond each end of the oven, said support means including longitudinal movable carriages releasably secured to opposite ends of the mandrel and supported by the bed means to fix the ends of the mandrel for movement through the oven, said carriages including the means permitting rotation of the mandrel, and said drive means being disposed within the oven for operatively coupling to said mandrel upon movement of the mandrel into the oven to establish and maintain rotation of the mandrel while in the oven.

5. A conveyor in combination with an oven including a heated fluid means for heating the oven and having openings in opposite ends for moving a mandrel through the oven via said openings, which comprises a pair of laterally spaced endless chain supporting beds projecting inwardly of the oven and defining an exterior loading station and an exterior unloading station on opposite ends of the oven, said beds being spaced laterally greater than the length of said mandrel, each of said beds including an upstanding guide rail means adjacent the mandrel and a laterally spaced channel track, a supporting carriage on each bed and having an inverted V-shaped guide riding on said guide rail and longitudinal spaced roller means riding in the channel track, a connecting shaft journaled on each carriage and having a coupler for rigid releasable interconnection to one end of the mandrel to provide a vertically fixed support at both ends of the mandrel, one shaft being axially fixed and the other shaft being axially free to allow for linear expansion of the mandrel, a pair of endless chains each extending over one of said beds respectively and guided along the corresponding guide rail and having means engageable with the back and front side of the carriages for respective movement thereof through the oven, a drive sprocket fixed to the axially fixed connecting shaft outwardly of the supporting bed therefor, an endless chain drive rotatably supported within the oven in alignment with said drive sprocket and longitudinally movable between said oven openings, means to support the chain in the path of the drive sprocket and means to rotate the endless chain in the direction opposite to the movement of the mandrel through the oven.

References Cited by the Examiner

UNITED STATES PATENTS

| 2,377,532 | 6/45 | Waters | 34—104 |
|---|---|---|---|
| 2,451,597 | 10/48 | Wheeler | 18—48 |
| 2,481,130 | 9/49 | Lindemuth | 34—105 |
| 2,612,706 | 10/52 | Simpson et al. | 34—105 |
| 2,618,075 | 11/52 | Everhart | 34—105 |
| 2,913,770 | 11/59 | Beno | 18—48 |
| 2,997,739 | 8/61 | Smith et al. | 34—105 |

NORMAN YUDKOFF, *Primary Examiner.*